United States Patent
Du et al.

(10) Patent No.: US 10,275,933 B2
(45) Date of Patent: Apr. 30, 2019

(54) METHOD AND APPARATUS FOR RENDERING OBJECT FOR MULTIPLE 3D DISPLAYS

(71) Applicants: Lin Du, Beijing (CN); Wenjuan Song, Beijing (CN); Wei Zhou, Beijing (CN)

(72) Inventors: Lin Du, Beijing (CN); Wenjuan Song, Beijing (CN); Wei Zhou, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 99 days.

(21) Appl. No.: 14/893,784

(22) PCT Filed: May 24, 2013

(86) PCT No.: PCT/CN2013/076188
§ 371 (c)(1),
(2) Date: Nov. 24, 2015

(87) PCT Pub. No.: WO2014/186972
PCT Pub. Date: Nov. 27, 2014

(65) Prior Publication Data
US 2016/0104313 A1 Apr. 14, 2016

(51) Int. Cl.
*G06T 15/20* (2011.01)
*G06T 7/73* (2017.01)
(Continued)

(52) U.S. Cl.
CPC ............ *G06T 15/20* (2013.01); *G06F 3/0346* (2013.01); *G06F 3/1423* (2013.01); *G06F 3/1454* (2013.01); *G06K 9/4604* (2013.01); *G06T 7/13* (2017.01); *G06T 7/73* (2017.01); *H04N 13/279* (2018.05); *H04N 13/302* (2018.05);
(Continued)

(58) Field of Classification Search
CPC .................................. G06T 7/73; G06T 15/20
See application file for complete search history.

(56) References Cited

U.S. PATENT DOCUMENTS

| 4,982,345 A * | 1/1991 | Callahan ................. G06T 15/30 345/628 |
| 5,422,653 A | 6/1995 | Maguire, Jr. |

(Continued)

FOREIGN PATENT DOCUMENTS

| CN | 101344816 | 1/2009 |
| CN | 102110379 | 6/2011 |

(Continued)

OTHER PUBLICATIONS

Robert Kooima, Generalized Perspective Projection, Louisiana State University Journal for the School of Electrical Engineering and Computer Science, Jun. 2009, pp. 1-7.

(Continued)

*Primary Examiner* — Jitesh Patel
(74) *Attorney, Agent, or Firm* — Tutunjian & Bitetto, P.C.

(57) ABSTRACT

The invention provides a method and apparatus for rendering an object for a plurality of 3D displays. The method comprises determining one of the plurality of 3D displays to render the object according to the relationship, in a global coordinate system, the position of the object and a region defined from a user's eyes to the 3D display; and rendering the object on the determined 3D display.

5 Claims, 6 Drawing Sheets

(51) Int. Cl.
   *H04N 13/302* (2018.01)
   *H04N 13/383* (2018.01)
   *G06F 3/14* (2006.01)
   *G06F 3/0346* (2013.01)
   *G06K 9/46* (2006.01)
   *G06T 7/13* (2017.01)
   *H04N 13/279* (2018.01)
   *H04N 13/376* (2018.01)
   *H04N 13/373* (2018.01)
   *G09G 3/00* (2006.01)

(52) U.S. Cl.
   CPC ......... *H04N 13/373* (2018.05); *H04N 13/376* (2018.05); *H04N 13/383* (2018.05); *G06K 2009/4666* (2013.01); *G06T 2200/04* (2013.01); *G09G 3/003* (2013.01); *G09G 2354/00* (2013.01); *G09G 2370/022* (2013.01)

(56) References Cited

U.S. PATENT DOCUMENTS

| | | | | |
|---|---|---|---|---|
| 5,446,834 | A | 8/1995 | Deering | |
| 5,784,035 | A * | 7/1998 | Hagiwara | G06F 3/1446 345/1.3 |
| 6,545,669 | B1 * | 4/2003 | Kinawi | G06F 3/0486 345/1.1 |
| 2005/0104881 | A1 * | 5/2005 | Yoshida | G01C 21/3638 345/419 |
| 2007/0070065 | A1 * | 3/2007 | Lee | G06T 13/20 345/419 |
| 2009/0167737 | A1 * | 7/2009 | Chen | G06F 21/83 345/207 |
| 2010/0007657 | A1 * | 1/2010 | Rurin | G06T 15/20 345/419 |
| 2010/0201645 | A1 * | 8/2010 | Asami | G06F 3/04842 345/173 |
| 2010/0201790 | A1 * | 8/2010 | Son | G02B 27/2264 348/53 |
| 2010/0285876 | A1 * | 11/2010 | Takahashi | A63F 13/10 463/32 |
| 2011/0187706 | A1 * | 8/2011 | Vesely | G06T 15/00 345/419 |
| 2011/0209089 | A1 * | 8/2011 | Hinckley | G06F 1/1647 715/810 |
| 2011/0285704 | A1 | 11/2011 | Takeda et al. | |
| 2011/0291964 | A1 * | 12/2011 | Chambers | G06F 1/1616 345/173 |
| 2012/0026108 | A1 * | 2/2012 | Sugita | G06F 3/005 345/173 |
| 2012/0026183 | A1 * | 2/2012 | Qi | G02C 13/003 345/589 |
| 2012/0162195 | A1 * | 6/2012 | Yamada | H04N 13/0275 345/419 |
| 2012/0162384 | A1 * | 6/2012 | Vesely | G06T 19/006 348/47 |
| 2012/0249429 | A1 * | 10/2012 | Anderson | G06F 3/011 345/173 |
| 2012/0326946 | A1 * | 12/2012 | Yuan | G06F 3/1446 345/1.3 |
| 2013/0222385 | A1 * | 8/2013 | Dorsey | G06T 11/20 345/427 |
| 2013/0232422 | A1 * | 9/2013 | Yu | G06F 3/0484 715/733 |
| 2013/0278499 | A1 * | 10/2013 | Anderson | G06F 3/01 345/156 |
| 2013/0290876 | A1 * | 10/2013 | Anderson | G06T 19/006 715/761 |
| 2016/0034029 | A1 * | 2/2016 | Lyons | G06F 3/013 715/748 |

FOREIGN PATENT DOCUMENTS

| | | |
|---|---|---|
| CN | 102959616 | 3/2013 |
| WO | 9622660 | 7/1996 |
| WO | WO2012011044 | 1/2012 |

OTHER PUBLICATIONS www.nvidia.com/object/3d-vision-surround-technology.html—3D Surround Technology—Geforce GTX 500 Series—retrieved from Internet on Aug. 21, 2012; pp. 1-3.

Yang et al., "Evaluation of an eye tracking technology for 3D display applications", 3DTV-CON'08—Conference: The True Vision—Capture, Transmission and Display of 3D Video, May 28-30, 2008; pp. 345-348.

Search Report dated Feb. 27, 2014.

* cited by examiner

METHOD AND APPARATUS FOR RENDERING OBJECT FOR MULTIPLE 3D DISPLAYS

This application claims the benefit, under 35 U.S.C. § 365 of International Application PCT/CN2013/076188, filed May 24, 2013, which was published in accordance with PCT Article 21(2) on Nov. 27, 2014 in English.

TECHNICAL FIELD

The present invention generally relates to image processing technology. In particular, the present invention relates to a method and apparatus for rendering an object for multiple 3D (three dimensional) displays.

BACKGROUND

Rendering is one of the major topics of 3D computer graphics, which refers to the process of generating an image from a model by means of computer programs.

In computer graphics, a multi-screen interactivity (e.g. second screen, triple play, and etc.) is a new human computer interaction technology involving multiple displays and input devices, such as TV, mobile or tablet/pad, which gives users another way of issuing commands and consuming media content. In a multi-screen application, many interactions involve transferring a virtual object from one screen to another. Such multi-screen application can be applied in the context of both 2D and 3D displays.

In 2D cases, in order to transfer a virtual object from one screen to another, it only needs to render the virtual object to make it disappear at one screen and appear at the other at the same time. Therefore, the time synchronization of content is one of key issues in 2D multi-screen applications so that contents and user input at different devices can be aligned along the timeline. However, it is impossible in 2D environment to create an immersive user experience which makes a user feel that an object is really "moving" from one screen to another.

In 3D multi-screen cases, it is now possible to render a virtual object so that it can be transferred between different screens as long as they are close to each other in a manner that the virtual object is spatially synchronized, i.e. the size, posture and position of the object keep continuous in the 3D space defined according to the specific user during the movement. In 3D multi-screen applications, only the time synchronization is not enough and a spatial synchronization is also important to give a user a consistence 3D experience. The spatial synchronization issue in 3D multi-screen applications has not been well studied yet.

SUMMARY

In view of the above problem in the conventional technologies, the invention proposes a method and apparatus for rendering an object for a plurality of 3D displays, which help solve the spatial synchronization issue in 3D multi-screen applications so that a user can transfer a virtual object among different 3D displays seamlessly.

According to one aspect of the invention, a method for rendering an object for a plurality of 3D displays is provided. The method comprises: determining one of the plurality of 3D displays to render the object according to the relationship, in a global coordinate system, the position of the object and a region defined from a user's eyes to the 3D display; and rendering the object on the determined 3D display.

According to one aspect of the invention, an apparatus for rendering an object for a plurality of 3D displays is provided. The apparatus comprises: means for determining one of the plurality of 3D displays to render the object according to the relationship, in a global coordinate system, the position of the object and a region defined from a user's eyes to the 3D display; and means for rendering the object on the determined 3D display.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings.

DETAILED DESCRIPTION

An embodiment of the present invention will now be described in detail in conjunction with the drawings. In the following description, some detailed descriptions of known functions and configurations may be omitted for conciseness.

Figure 1:
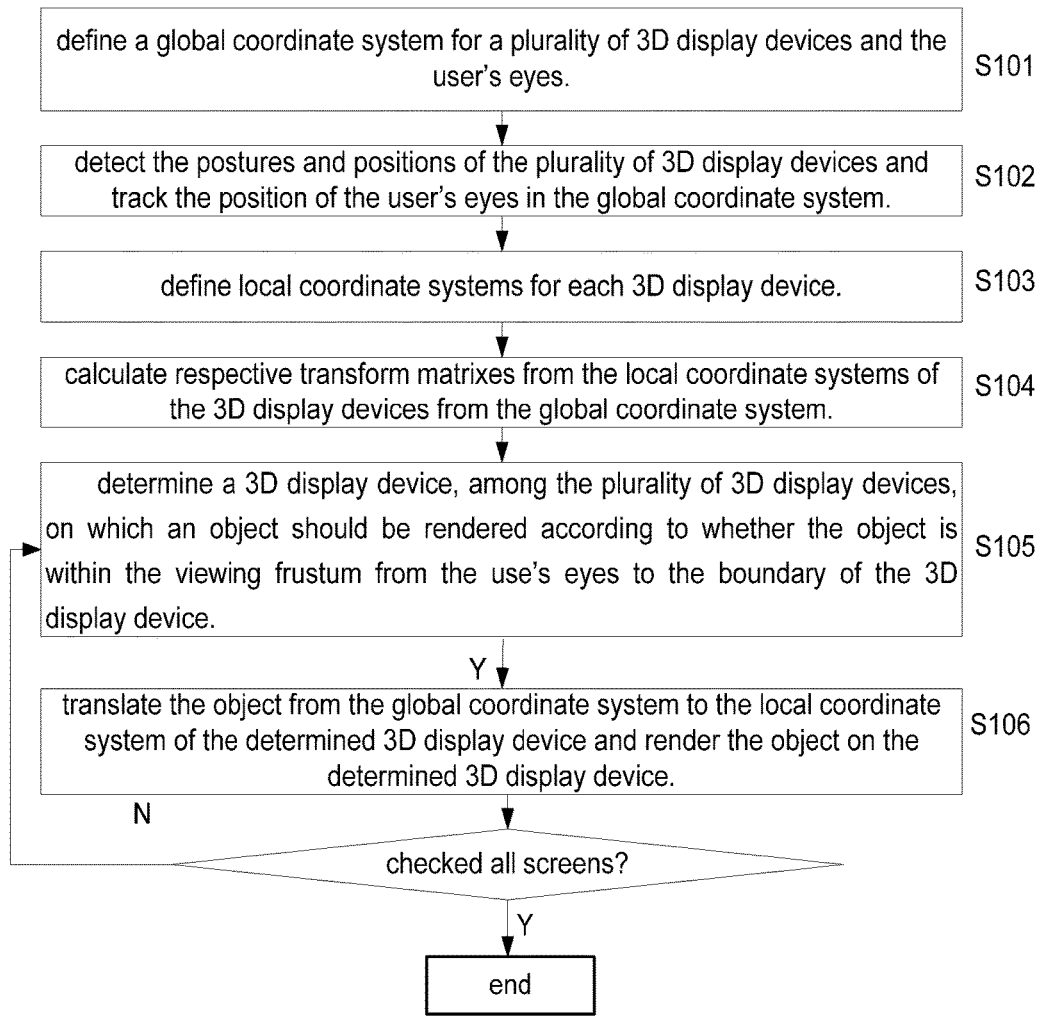
FIG. 1 is a flow chart showing a method for rendering an object for a plurality of 3D display devices according to an embodiment of the present invention.

FIG. 1 is a flow chart showing a method for rendering an object for a plurality of 3D display devices according to an embodiment of the present invention.

As shown in FIG. 1, at step S101, it defines a global coordinate system for a plurality of 3D display devices and the user's eyes. In computer graphics, a coordinate system is a system which uses one or more numbers or coordinates to uniquely determine the position of a point or other geometric element in a display space. And a geographic coordinate system is a coordinate system that enables every point in the display space to be specified by a set of numbers or coordinates. It could be appreciated by a person skilled in the art that 3D rendering will use a 3D coordinate system, wherein a point of a 3D model is referred to by three real numbers or coordinates, indicating the positions of the perpendicular projections from the point to three fixed, perpendicular and graduated lines, called the axes which intersect at the origin.

At step S102, it detects the postures and positions of the plurality of 3D display devices and tracks the position of the user's eyes in the global coordinate system. It could be appreciated that one or more of the plurality of 3D display devices and the user may be moveable. In such case, the tracked position of the user's eyes and the detected postures and positions of the 3D display devices should be updated in the global coordinate system according to their corresponding movements.

At step S103, it defines local coordinate systems for each 3D display devices. A local coordinate system of a display device uses one or more numbers or coordinates to uniquely determine the position of a point or other geometric element in the display space of the display device.

At step S104, it calculates respective transform matrixes from the local coordinate systems of the 3D display devices to the global coordinate system.

At step S105, it determines a 3D display device, among the plurality of 3D display devices, on which an object should be rendered according to whether the object is within the viewing frustum from the use's eyes to the boundary of the 3D display device. In 3D computer graphics, the viewing frustum is the region of space in the modeled world that may appear on the screen. The exact shape of this region varies depending on what kind of camera lens is being simulated, but typically it is a frustum of a rectangular pyramid. It could be appreciated that the step S105 may involve the determination of the position and posture of the object in the global coordinate system. In addition, during the interactivity of the user with the 3D display device, the position and posture of the object may be changed as a function of a user input, for example, by an input device. As will be described later, a use may use an input device to manipulate an object displayed on one of the 3D display devices. In this case, it could be appreciated by a person skilled in the art that the above described steps S102 to S104 should also be implemented to the input device.

At step S106, it translates the object from the global coordinate system to the local coordinate system of the determined 3D display device and renders the object on the determined 3D display device.

Next, an embodiment of the invention providing a method and apparatus for 3D multi-screen interactivity using eye-tracking technique to enable a seamless transition of virtual objects between multiple 3D display devices will be described in details.

Specifically, the method will be described in details with reference to an embodiment of so called double-screen application, i.e., a user transferring a virtual object from a 3D display device to another 3D display device.

Figure 2:
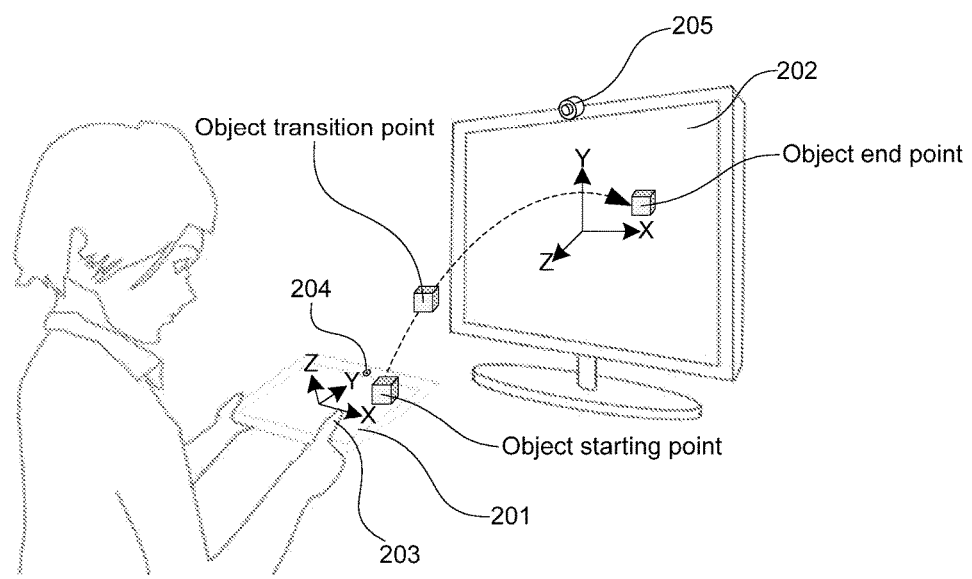
FIG. 2 is an exemplary diagram showing a typical application scenario where a user transfers a virtual object from a first 3D display device to a second 3D display device.

FIG. 2 is an exemplary diagram showing a typical application scenario where a user transfers a virtual object from a first 3D display device to a second 3D display device.

In FIG. 2, for illustrative purpose only, the first 3D display device is shown as a 3D tablet/pad with a 3D screen 201 and the second 3D display device is shown as a 3D TV with a 3D screen 202. It can be appreciated that other types of 3D display device can also be applied in this invention. The 3D screen 201 is a touchscreen in this example, with which the user can manipulate an object displayed on the screen 201 through simple or multi-touch gestures by touching the screen with an input device 203 (stylus or the user's fingers). As for manipulating, it means to change one or more of the display parameters of the object, including but not limited to position and posture. As one example of the mentioned manipulation, the user can change the position and posture of the virtual object to transfer it from an object starting point on the 3D screen 201 to an object end point of the 3D screen 202 seamlessly. Next, a method for object transition between the 3D screens 201 and 202 according to an embodiment of the invention will be described with reference to the application scenario in FIG. 2. For simplicity of the illustration, a case with only two 3D display devices is described. It can be appreciated by a person skilled in the art that the invention can also be applied in the context of object transition among multiple 3D display devices.

According to the embodiment of the invention as described with reference to FIG. 1, for purpose of completing the spatial synchronization for 3D multi-screen applications during the transferring of the object, two major processes are carried out, that is, a calibration process to calibrate the relative positions and postures of involved 3D screens, as well as to track user's eye position, and an interaction process for transferring the object among the two 3D screens.

The calibration process is used to setup the local coordinates of all the 3D screens for local rendering and the transform matrix for coordinate transformation. If some 3D screens are mobile, then their positions and postures need to be updated in the real time using some online positioning techniques, such as radio positioning, camera positioning, gyroscope, and etc.

Figure 3:
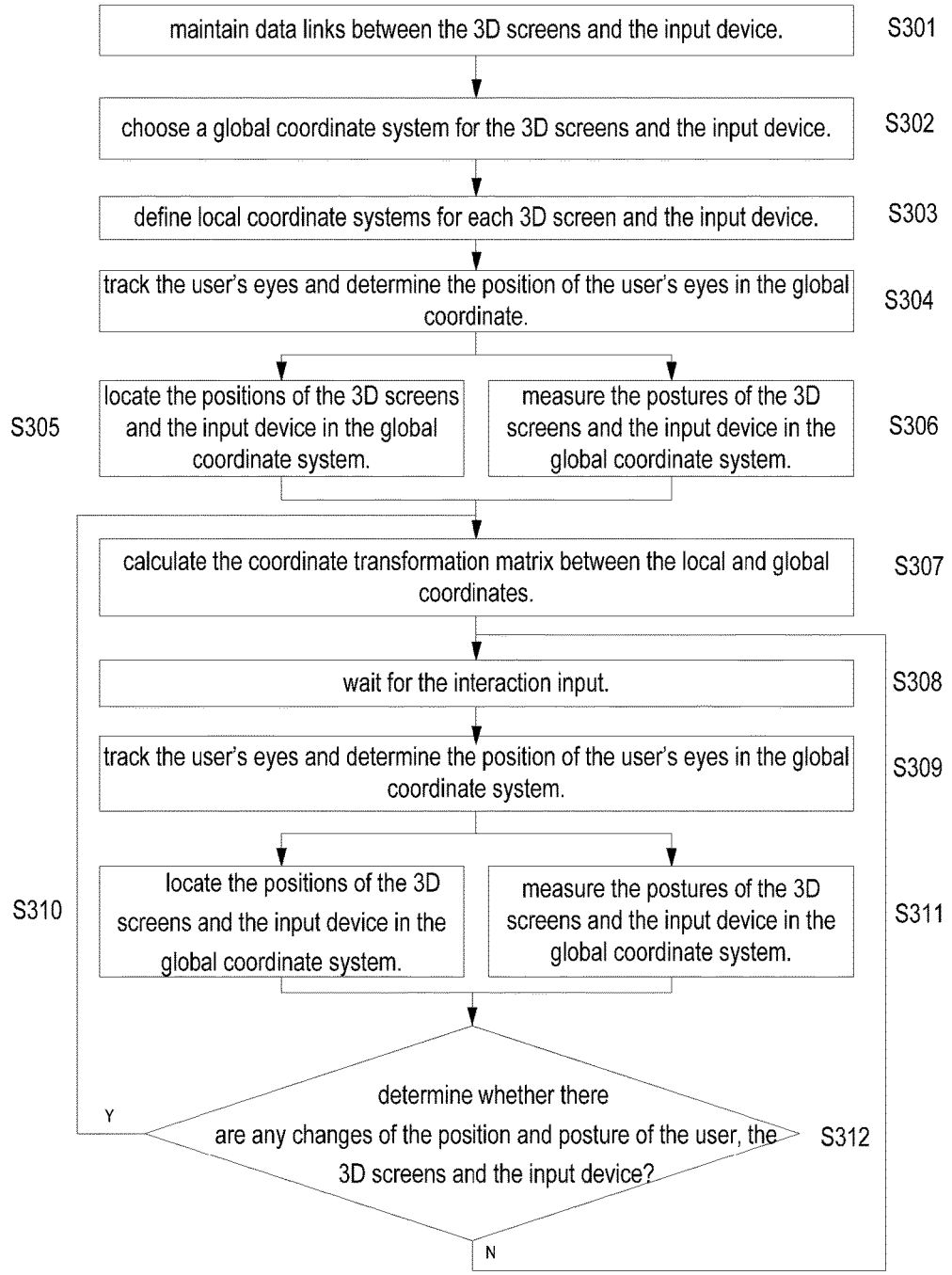
FIG. 3 is a flow chart showing a calibration process according to an embodiment of the present invention.

FIG. 3 is a flow chart showing a calibration process according to an embodiment of the present invention.

As shown in FIG. 3, before a user inputs any comments, the calibration process is carried out.

At step S301, it maintains data links between the 3D screens 201, 202 and the input device 203. Conventional wireless communication techniques, such as WiFi, Bluetooth and ZigBee, can be used for the data exchange between the 3D screens 201, 202 and the input device 203. It could be appreciated that the implementation of the method might need other devices, such as control server, workstation and data server. In that case, the above mentioned data links should also be maintained with these devices needed.

At step S302, it chooses a global coordinate system for the 3D screens 201, 202 and the input device 203. The global coordinate system will be used for the coordinate transformation in the following steps. Any unified coordinate system could be chosen for this purpose. In one example, the global coordinate system can be chosen relative to the ground of the room containing the 3D screens 201, 202. In another example, the global coordinate system can be chosen relative to a 3D screen with fixed position and posture. In this embodiment, the global coordinate system can be chosen relative to the 3D screen 202, which is the 3D TV.

At step S303, it defines local coordinate systems for each 3D screen and the input device. In this embodiment, the 3D screen 201 is provided with a touch screen for object manipulation with fingers or stylus as the input device 203. In this case, the 3D screen 201 and the input device 203 could share the same local coordinate system. It could be appreciated that if the 3D screen 201 applies other interaction mechanism which cooperate with other input devices (for example, video cameras for gesture recognition of user's figure or input device), the 3D screen 201 and the input device will be defined with different local coordinate systems.

At step S304, it tracks the user's eyes and determines the position of the user's eyes in the global coordinate system. Eye tracking is the process of measuring either the point of gaze ("where we are looking") or the motion of an eye relative to the head. It has been used in diverse applications such as in visual system, in psychology, in cognitive linguistics and in product design. In the past, several methods for following eye movement were developed based on light reflected on the cornea, devices mounted on helmets or on electrodes that measure the activity of the eyeball extrinsic muscles. These methods require the placement of devices on the user and therefore his autonomy is limited. Lately, many biometric techniques have been developed allowing identification of faces, iris, etc based on digital image processing algorithms which are called non-invasive methods and wildly used. For example, a non-invasive method to detect drowsiness in the transportation industry would allow avoidance of accidents due to loss of alertness. Among possible applications of non-invasive drowsiness detector are alarms for large vehicle operators, aircraft pilots, operators of high-tech machinery in the mining industry, etc. The eye-tracking can be done using computer vision based methods with the built-in camera on the screen or other methods and devices, such as those in Duchowski, Andrew T. Eye tracking methodology: Theory and practice. Vol. 373. Springer, 2007. It could be appreciated that at least one eye-tracker provided on one or more 3D screens can be used for the purpose of eye tracking. As shown in FIG. 2, in this embodiment, two eye trackers 204 and 205 respectively provided on the first screen 201 and the second screen 202 are used for purpose of the eye tracking of the user. It could be appreciated that more eye tracker can be used according to different application requirements.

At step S305, it locates the positions of the 3D screens 201, 202 and the input device 203 in the global coordinate system. WiFi positing or Infra-red positioning techniques can be used for locating the position. For example, a method for indoor mobile positioning disclosed in Evennou F, Marx F. Advanced integration of WiFi and inertial navigation systems for indoor mobile positioning[J], Eurasip journal on applied signal processing, 2006, 2006: 164-164 can be used. The located positions can be expressed using the position value in the three axes of the global coordinate system.

At step S306 in parallel to step S305, it measures the postures of the 3D screens 201, 202 and the input device 203 in the global coordinate system. For this purpose, build-in gyroscopes, g-sensor or other devices in the 3D screen 201 (not shown) can be used. The measured posture can be expressed using the rotation angles along the three axes of the global coordinates.

At step S307, it calculates the coordinate transformation matrix between the local and global coordinate systems. Conventional geometry techniques can be used for this purpose based on the position and posture of input device or 3D screens, so that for any point p(x,y,z) in coordinates 1, it can be transformed into a point p'(x',y',z')=p(x,y,z)*M in coordinates 2, while points p and p' share the same physical position in the real world.

At step S308, it waits for the interaction input. It could be appreciated that the interaction input may include the changes of the position of the user, the 3D screens and the input device and the posture of the 3D screens and the input device. Therefore, in the following steps the above changes will be detected and relevant positions, postures, local coordinates and transformation matrix will be updated accordingly.

As shown in FIG. 3, at step S309, it tracks the user's eyes and determines the positions of the user's eyes in the global coordinate system.

At step S310, it locates the positions of the 3D screens 201, 202 and the input device 203 in the global coordinate system.

At step S311 in parallel to step S310, it measures the postures of the 3D screens 201, 202 and the input device 203 in the global coordinate system.

At step S312, it determines whether there are any changes of the position and posture of the user, the 3D screens and the input device according to the comparison between the results of steps S309, S310, S311 and those of the steps S304, S305, S306 respectively. If the result of step S312 is yes, the control is returned to step S307 to calculate the coordinate transformation matrix between the local and global coordinates based on the updated results. Otherwise, the control is returned to step S308 to wait for the interaction input.

Figure 4:
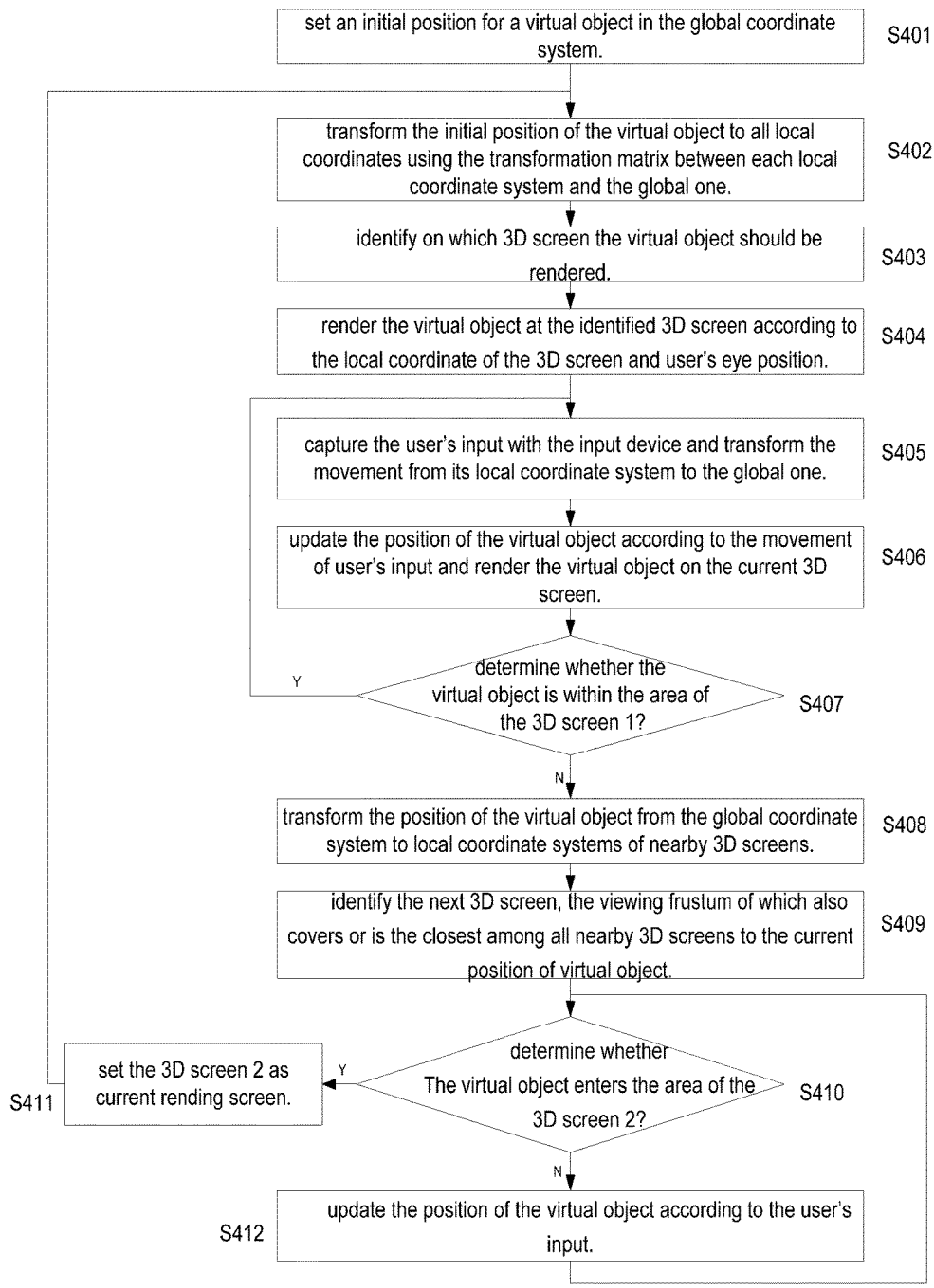
FIG. 4 is a flow chart showing an interaction process according to an embodiment of the present invention.

FIG. 4 is a flow chart showing an interaction process according to an embodiment of the present invention. With the interaction process, a virtual object can be transferred from the 3D screen 201 to another 3D screen 202 seamlessly.

At step S401, it set an initial position for a virtual object in the global coordinate system. This initial position of the virtual object is usually decided by applications. In this embodiment, the initial position is the object starting point on the first screen 201 of the pad, shown in FIG. 2.

At step S402, it transforms the initial position of the virtual object to all local coordinates using the transformation matrix between each local coordinate systems and the global one calculated in S307.

Figure 5:
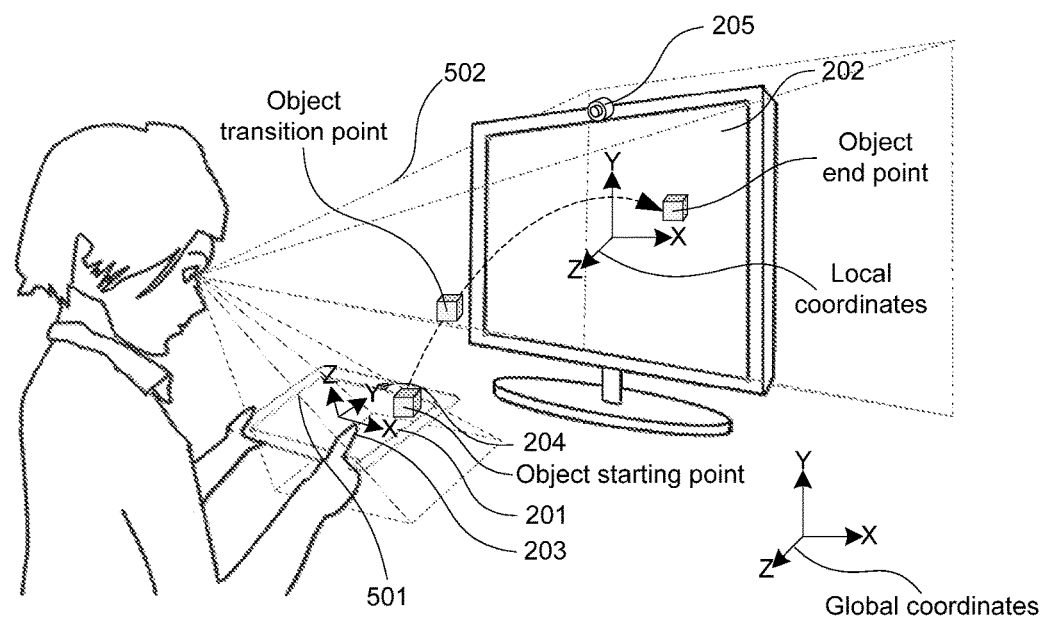
FIG. 5 is an exemplary diagram showing a determination of a 3D screen to render a virtual object with the viewing frustum.

At step S403, it identifies on which 3D screen the virtual object should be rendered. The determination is made by checking if the position of the virtual object is within the viewing frustum defined from the position of the user's eye to the boundary of each 3D screen with its local coordinate system. FIG. 5 is an exemplary diagram showing a determination of 3D screen to render a virtual object with the viewing frustum. As shown in FIG. 5, the viewing frustums of the 3D screens 201, 202 are shown by dash lines. The viewing frustum 501 of the 3D screen 201 is a pyramid-like box defined from the position of the user's eye and the boundary of the 3D screen 201 which is in a rectangular shape in this case. Similarly, the viewing frustum 502 of the 3D screen 202 is also a pyramid-like box defined from the position of the user's eye to the boundary of the 3D screen 202 which is also in a rectangular shape in this case. In this case, as shown in FIG. 5, the initial position of the object, which is the starting point on the 3D screen 201, is within the viewing frustum of the 3D screen 201.

Figure 6:
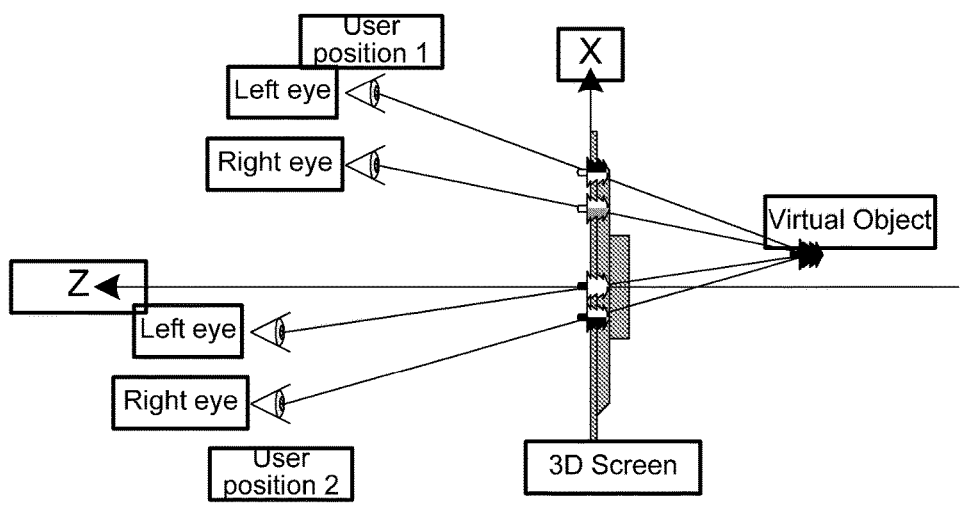
FIG. 6 is an exemplary diagram showing a process for rendering a virtual object according to the position of user's eyes according to an embodiment of the present invention.

At step S404, it renders the virtual object at the identified 3D screen 201 according to the local coordinate of the 3D screen 201 and user's eye position. It should be noted that when rendering a virtual object on a 3D screen, normally the local coordinates of this 3D screen will be used. However, the global coordinate system could also be used for rendering according to different application context. It could be appreciated by a person skilled in that art that, for stereoscopic 3D displays, a virtual object can be rendered according to user's eye position so as to make it looks like at a fixed position. This is done by dynamically calculating the offset and disparity of the left and right view with consideration of user's eye positions, screen position and posture. FIG. 6 is an exemplary diagram showing a process for rendering a virtual object according to the position of user's eyes according to an embodiment of the present invention. As illustrated in FIG. 6, when user is watching the 3D screen at positions 1 and 2, the virtual object can be always at the same position if the 3D screen renders the object adaptively.

At step S405, it captures the user's input with the input device 203 and transforms the movement from its local coordinate system to the global one. In this embodiment, the input device 203 is stylus or the user's fingers in cooperation with a touch screen. But it could be appreciated that other devices, such as mouse or camera, may also be used as input device in view of the application context.

At step S406, it updates the position of the virtual object according to the movement of user's input and renders the virtual object on the current 3D screen, the 3D screen 201 in this case.

At step S407, it determines whether the virtual object is within the scope of the 3D screen 1, which is defined by the viewing frustum 501 and the projection of the viewing frustum 501 to the boundary of the 3D screen 201. FIG. 5 shows this scope, with dash lines. As shown in FIG. 5, the above mentioned scope not only includes the scope of the viewing frustum 501 but also the scope behind the 3D screen 201 which is defined by the projection of the viewing frustum 501 to the boundary of the 3D screen 1.

If the result of the step S407 is "Yes", the control is returned to step S405. Otherwise, the control is passed to step S408 wherein it transforms the position of the virtual object from the global coordinate system to local coordinate systems of nearby 3D screens. In this embodiment, only two 3D screens are discussed. Therefore, the position of the virtual object is transformed from the global coordinate system to local coordinate systems of the 3D screen 202. It could be appreciated that if there are more than two 3D screens in the system, the position of the virtual object will be transformed from the global coordinate system to all local coordinate systems of nearby 3D screens.

At step S409, it identifies the next 3D screen, the viewing frustum of which also covers or is the closest among all nearby 3D screens to the current position of virtual object. In this embodiment, if the current position of virtual object is within the viewing frustum of the second 3D screen 202, then the second 3D screen 202 is identified as the next 3D screen.

At step S410, it determines whether the virtual object enters the scope of the second 3D screen 202. Here, the definition of the scope of the second 3D screen 202 is similar to that of the 3D screen 201 described above. Detailed descriptions are therefore omitted.

If the result of step S410 is "Yes", the control is passed to step S 411 wherein it sets the second 3D screen as current rending screen. And then the control is returned to step S402, whereby the virtual object is rendered on the 3D screen 2 according to user's position so as to keep the transition seamlessly from the user point of view. Otherwise, the control is passed to step S412 wherein it continues to updates the position of the virtual object according to the user's input.

It is to be understood that the present invention may be implemented in various forms of hardware, software, firmware, special purpose processors, or a combination thereof, for example, within any one or more of the plurality of 3D display devices or their respective driving devices in the system and/or with a separate server or workstation. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for rendering an object in a system comprising a plurality of 3D displays, the system corresponds to a global coordinate system and each of the plurality of 3D displays corresponds to a local coordinate system, the method comprising:

detecting postures and positions of the plurality of 3D display devices and tracking positions of a user's eyes in the global coordinate system;

calculating transform matrixes between the local coordinate systems of the plurality of 3D display devices and the global coordinate system;

transforming a position of the object to local coordinates of the plurality of 3D displays using the transform matrixes;

determining on which one of the plurality of 3D displays to render the object according to whether the object is within a viewing frustrum from the position of the user's eyes to a boundary of each of the plurality of 3D displays;

rendering the object on the one of the plurality of 3D displays;

receiving an input from the user to change the position of the object in the global coordinate system, and upon detection of the changed position being out of a scope of the determined 3D display device defined by the viewing frustum of the determined 3D display device and a projection scope from the viewing frustum to the boundary of the determined 3D display device, switching to rendering the object at the changed position in the global coordinate system on another one among the plurality of 3D display devices.

2. The method according to claim 1, wherein the input is received from an input device for the user to manipulate the object.

3. The method according to claim 1, wherein the switching comprises:

transforming the changed position of the object from the global coordinate system to local coordinate systems of other 3D display devices of the plurality of 3D display devices;

identifying a 3D display device, a viewing frustum of which also covers or is the closest among all the other 3D display devices to the changed position of the object; and upon detection of the changed position being within the scope of the identified 3D display device defined by the viewing frustum of the identified 3D display device and a projection scope from the viewing frustum to the boundary of the identified 3D display device, rendering the object at the changed position in the global coordinate system on the identified 3D display device.

4. The method according to claim 1, wherein one of the plurality of 3D display devices has a fixed posture and position and the local coordinate system of said 3D display device is defined as the global coordinate system.

5. An apparatus for rendering an object in a system comprising a plurality of 3D displays, wherein the system corresponds to a global coordinate system and each of the plurality of 3D displays corresponds to a local coordinate system, the apparatus comprising a processor configured to:
   detect postures and positions of the plurality of 3D display devices and tracking positions of a user's eyes in the global coordinate system;
   calculate transform matrixes between the local coordinate systems of the plurality of 3D display devices and the global coordinate system;
   transform a position of the object to local coordinates of the plurality of 3D displays using the transform matrixes;
   determine on which one of the plurality of 3D displays to render the object according to whether the object is within a viewing frustrum from the position of the user's eyes to a boundary of each of the plurality of 3D displays;
   render the object on the one of the plurality of 3D displays;
   receive an input from the user to change the position of the object in the global coordinate system, and
   upon detection of the changed position being out of a scope of the determined 3D display device defined by the viewing frustum of the determined 3D display device and a projection scope from the viewing frustum to the boundary of the determined 3D display device, switch to render the object at the changed position in the global coordinate system on another one among the plurality of 3D display devices.

* * * * *